US008863363B2

(12) United States Patent
Martienssen et al.

(10) Patent No.: US 8,863,363 B2
(45) Date of Patent: Oct. 21, 2014

(54) METHOD FOR FABRICATING A SUPERCAPACITOR ELECTRONIC BATTERY

(75) Inventors: Werner Oskar Martienssen, Dreieich (DE); Rosalinda Martienssen, legal representative, Dreieich (DE); Glyn Jeremy Reynolds, Largo, FL (US)

(73) Assignee: Oerlikon Advanced Technologies AG, Balzers (LI)

( * ) Notice: Subject to any disclaimer, the term of this patent is extended or adjusted under 35 U.S.C. 154(b) by 261 days.

(21) Appl. No.: 13/389,368

(22) PCT Filed: Aug. 3, 2010

(86) PCT No.: PCT/CH2010/000187
§ 371 (c)(1),
(2), (4) Date: Apr. 19, 2012

(87) PCT Pub. No.: WO2011/014970
PCT Pub. Date: Feb. 10, 2011

(65) Prior Publication Data
US 2012/0216379 A1    Aug. 30, 2012

Related U.S. Application Data

(60) Provisional application No. 61/232,068, filed on Aug. 7, 2009, provisional application No. 61/232,071, filed on Aug. 7, 2009.

(51) Int. Cl.
| | |
|---|---|
| *H01G 7/00* | (2006.01) |
| *H01G 9/00* | (2006.01) |
| *H01G 11/00* | (2013.01) |
| *H01G 9/04* | (2006.01) |
| *H01G 11/56* | (2013.01) |
| *H01G 11/24* | (2013.01) |
| *H01G 11/70* | (2013.01) |
| *H01G 9/022* | (2006.01) |
| *H01G 11/04* | (2013.01) |

(52) U.S. Cl.
CPC ............... *H01G 9/155* (2013.01); *H01G 11/00* (2013.01); *H01G 9/058* (2013.01); *H01G 11/56* (2013.01); *H01G 11/24* (2013.01); *H01G 11/70* (2013.01); *H01G 9/038* (2013.01); *Y02T 10/7022* (2013.01); *Y02E 60/13* (2013.01); *H01G 11/04* (2013.01)
USPC ...... 29/25.42; 29/592.1; 29/623.1; 361/301.1; 361/311; 361/500; 361/502; 361/523

(58) Field of Classification Search
CPC ........ B82Y 30/00; H01M 2/00; H01M 4/139; H01M 6/18; H01M 6/24; H01M 6/425; H01M 8/1018; H01M 8/1069; H01M 10/00; H01M 10/049; H01M 10/056; H01M 10/058; H01M 16/00; Y02E 60/12; Y02E 60/13
USPC ........... 29/25.42, 592.1; 361/301.1, 311, 500, 361/502, 523
See application file for complete search history.

(56) References Cited

U.S. PATENT DOCUMENTS

| | | | | |
|---|---|---|---|---|
| 6,328,770 | B1 * | 12/2001 | Gozdz | 29/623.3 |
| 8,236,446 | B2 * | 8/2012 | Lu | 429/209 |

(Continued)

FOREIGN PATENT DOCUMENTS

| | | |
|---|---|---|
| CN | 1498436 A | 5/2004 |
| CN | 101310400 A | 11/2008 |

(Continued)

*Primary Examiner* — Paul D Kim
(74) *Attorney, Agent, or Firm* — Nath, Goldberg & Meyer; Jerald L. Meyer

(57) ABSTRACT

A method for fabricating a supercapacitor-like electronic battery includes forming a first current collectors on a substrate. A first electrode is formed on the first current collector. A first electrode is formed from a first solid state electrolyte and a first conductive material where the first conductive material is irreversible to the mobile ions contained in the first solid state electrolyte and the first conductive material exceeds the percolation limit. An electrolyte is formed on the first electrode. A second electrode is formed on the electrolyte. The second electrode is formed from a second solid state electrolyte and a second conductive material where the second conductive material is irreversible to the mobile ions contained in the second solid state electrolyte and the second conductive material exceeds the percolation limit. A second current collector is formed on the second electrode.

19 Claims, 5 Drawing Sheets

Schematic Cross-Section of Multi-Layer Thin-Film Electronic Battery

(56) References Cited

U.S. PATENT DOCUMENTS

| | | |
|---|---|---|
| 2002/0001747 A1 | 1/2002 | Jenson et al. |
| 2008/0158778 A1 | 7/2008 | Lipka et al. |
| 2010/0177462 A1* | 7/2010 | Adzic et al. ............ 361/502 |
| 2011/0261502 A1* | 10/2011 | Gruner ............ 361/502 |
| 2013/0045328 A1* | 2/2013 | Adzic et al. ............ 427/79 |

FOREIGN PATENT DOCUMENTS

| | | |
|---|---|---|
| EP | 1359636 A1 | 11/2003 |
| WO | 2008153564 A1 | 12/2008 |

* cited by examiner

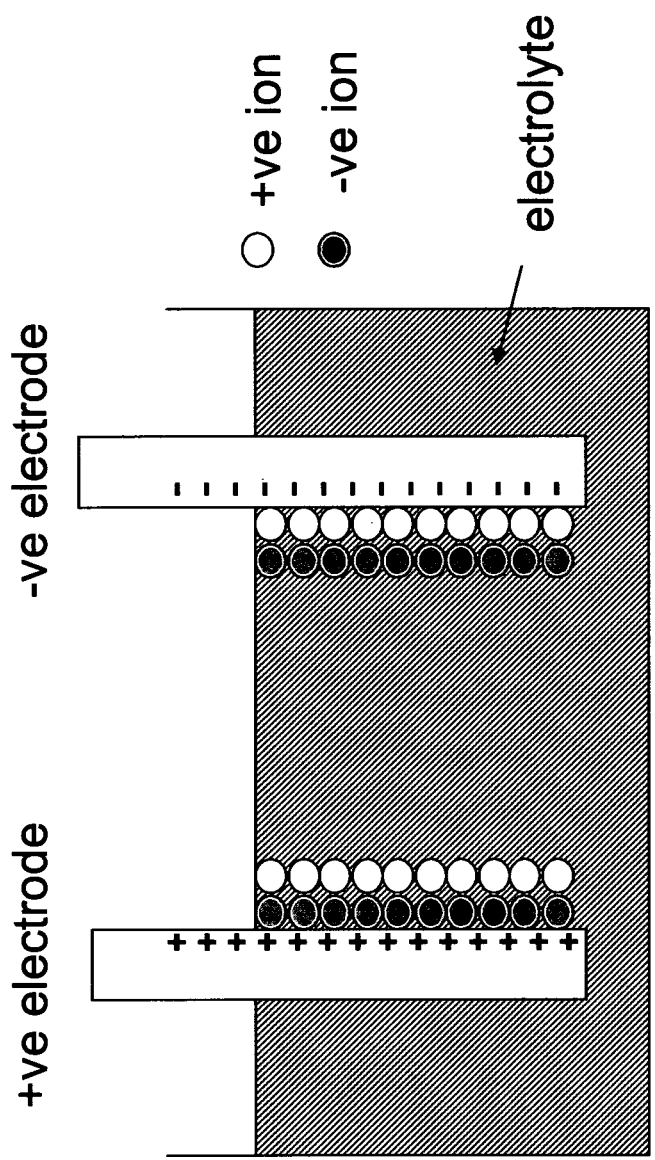
Figure 1: Schematic of Electrochemical Double Layer

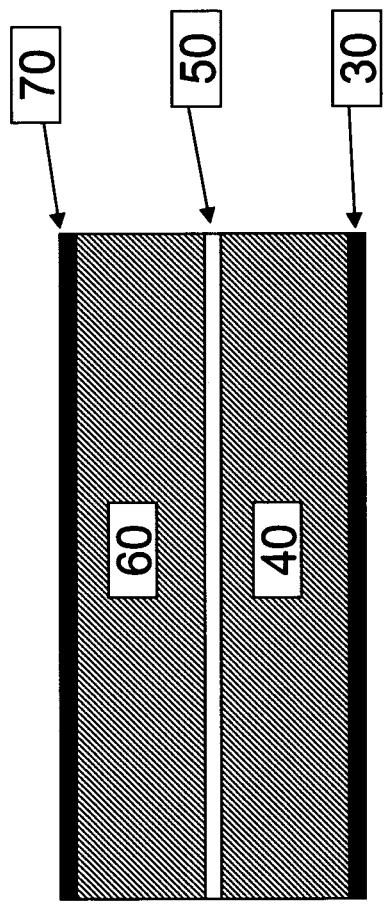
Figure 2: Schematic Cross-Section of Single Layer Electronic Battery

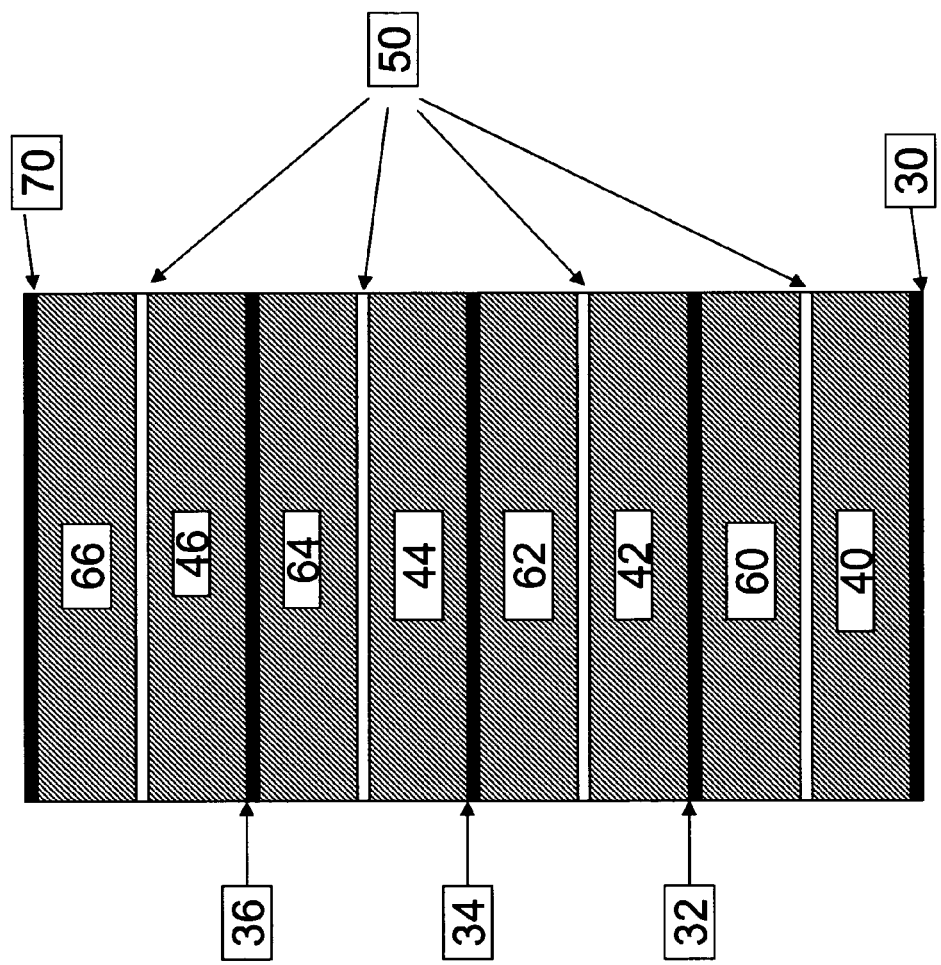
Figure 3: Schematic Cross-Section of Multi-Layer Electronic Battery

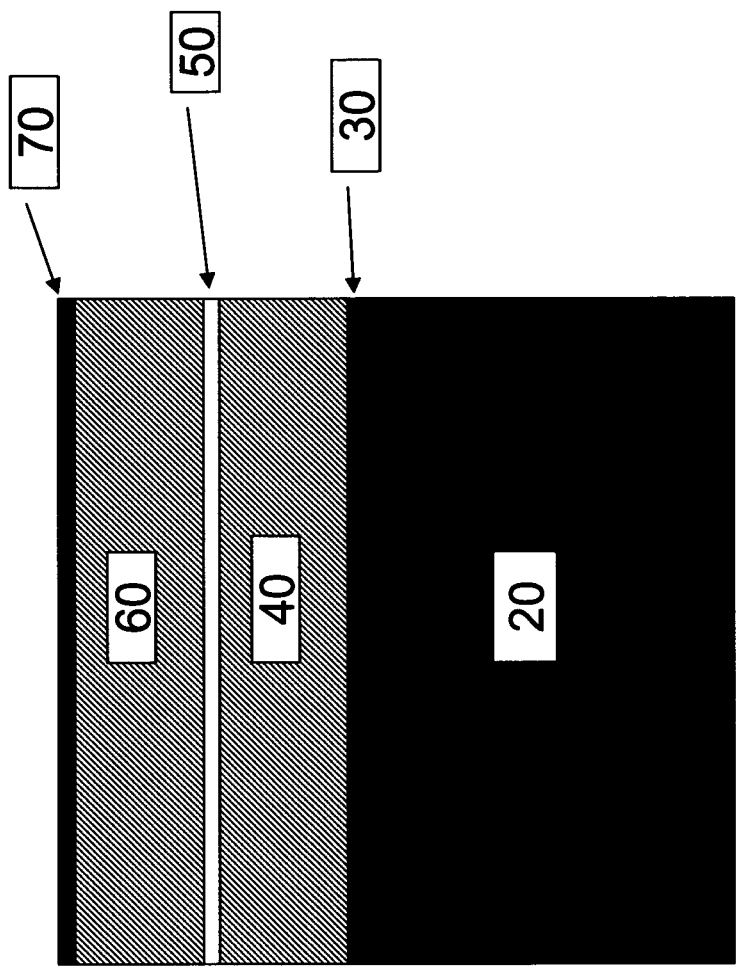
Figure 4: Schematic Cross-Section of Thin-Film Electronic Battery

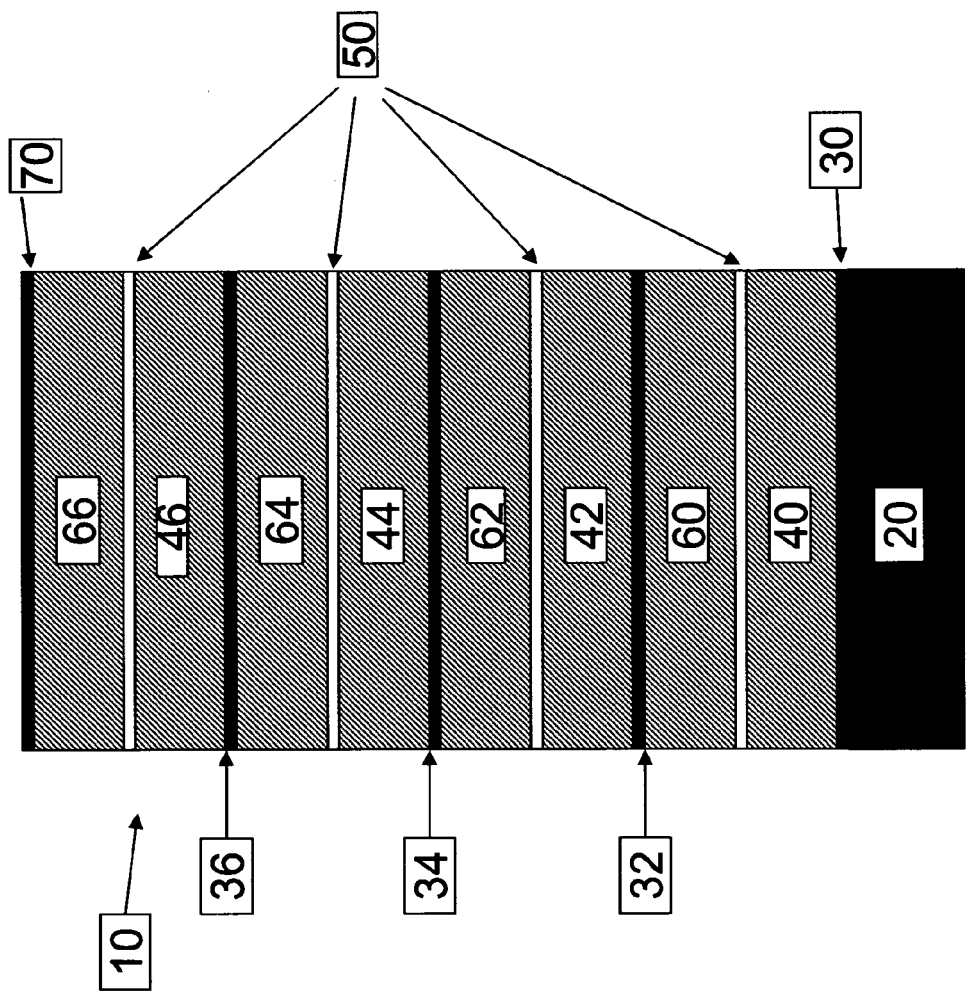
Figure 5: Schematic Cross-Section of Multi-Layer Thin-Film Electronic Battery

METHOD FOR FABRICATING A SUPERCAPACITOR ELECTRONIC BATTERY

CROSS REFERENCES TO RELATED APPLICATIONS

This application claims priority from and is related to commonly owned U.S. Provisional Patent Application Ser. No. 61/232,068 filed Aug. 7, 2009, entitled: All Solid-State Electrochemical Double Layer Supercapacitor, and U.S. Provisional Patent Application Ser. No. 61/232,071 filed Aug. 7, 2009, entitled: Fuel Cell/Supercapacitor/Battery Power System for Vehicular Propulsion, these Provisional Patent Applications incorporated by reference herein.

FIELD OF THE INVENTION

The present invention relates to solid-state energy-storage devices, and, more particularly, to electrolyte films in such devices. This invention also relates to methods and systems for fabricating solid-state energy-storage devices and the resulting devices such as batteries and supercapacitors.

BACKGROUND OF THE INVENTION

The world's known oil reserves are dwindling at an ever increasing rate as developing nations industrialize and demand increases. The price of oil exceeded $100 per barrel in 2008 and is very likely to become even more expensive in the future. For electricity generation, there are many alternatives to oil-fired power stations: natural gas, coal, nuclear and hydro-electric power stations are already widely deployed throughout the United States and other industrialized nations. However, burning both natural gas and coal leads to an increase of carbon dioxide levels in our atmosphere and as global warming accelerates and governments seek to address this growing concern, there has been much recent interest in renewable energy sources such as solar, wind and tides. It should be mentioned that although the percentage of our electricity generated by nuclear energy might increase in the future, this is no panacea. The public remember incidents at Chernobyl and Three Mile Island, and there are serious concerns about the radioactive waste that will remain hazardous for hundreds if not thousands of years. Furthermore, the use of nuclear energy for peaceful purposes nevertheless boosts the supply of fissionable fuel and increases the likelihood of nuclear proliferation with all its concomitant problems.

A multi-pronged problem such as this requires a strategy that incorporates several solutions. The aforementioned increase in the adoption of renewable sources of energy is a good start, but the world must also learn to reduce its energy consumption per capita and use its energy sources more effectively. One critical component needed to achieve these goals is efficient energy storage. Here again there will be many solutions: pumping water uphill, storing compressed gas in underground caverns, converting excess electrical energy to fuels such as hydrogen, flywheels, batteries and capacitors, just to name a few. Each solution has its preferred applications and currently, batteries and capacitors are the preferred methods of storing electrical energy in small and medium-sized portable electrical appliances. However, there is growing interest in the use of larger batteries and capacitors for vehicular propulsion and load leveling or power conditioning applications. Batteries and capacitors have also been proposed for storing energy from wind and photovoltaic generators to provide power at times when the wind is not blowing or it is dark. Finally, a new class of thin-film batteries is emerging for use with MEMS (Micro-ElectroMechanical Systems), SiP (System in a Package) and other microelectronic devices.

As with most industrial operations, it requires energy to manufacture batteries and capacitors. Moreover, these devices do not, per se, create energy but they can result in more efficient use of energy. Therefore, it is important to consider the net energy balance of a particular battery or capacitor in a given application. If the energy storage device ends up saving more energy over its lifetime than was used in its fabrication, it results in valuable energy savings and likely reduction in overall $CO_2$ emissions. If however the reverse is true, the impression that the technology in question is a "green" energy-conserving technology is illusory. Rechargeable battery manufacturing is a relatively energy intensive operation: high energy density lithium-ion batteries in particular require high purity materials, some of which must be prepared at high temperatures. Many early lithium-ion batteries had limited cycle lives of just a few hundred cycles and their net energy balance in many typical portable electronic applications was negative. They did provide better performance for a given size and weight and therefore reduced the overall size and weight of the device—before the severity of global warming and diminishing energy reserves was fully appreciated, this was the primary consideration. For vehicular propulsion and power station applications, it is critical that the net energy balance of the batteries is positive and that their lifetimes are sufficient to justify their use. By their very nature, the electrodes in electrochemical batteries undergo chemical changes during charging and discharging. These can be in the form of phase changes, structural changes and/or volume changes, all of which can severely degrade the integrity of the electrodes over time and reduce the capacity of the battery. Indeed, the charging and discharging processes in the latest generation lithium-ion batteries must be carefully controlled—overcharging or over-discharging can limit the performance and cause premature failure of the battery.

In contrast, capacitors store their energy as electrical charge on the electrodes. No chemical changes are involved and most capacitors have cycle lives of a million cycles or more, to 100% depth-of-discharge. Capacitors can also be charged and discharged orders of magnitude faster than electrochemical batteries making them particularly attractive for capturing rapidly released energy such as in falling elevator and automobile regenerative braking applications. Traditional electrostatic and electrolytic capacitors are used widely in electrical circuit applications but can store only relatively small amounts of energy per unit weight or volume. The emergence of electrochemical double layer (EDL) capacitors has now provided a viable alternative to traditional electrochemical batteries where power density and cycle life are more important than energy density. In fact, the latest generation EDL Supercapacitors have specific energies of ~25 Wh/kg, approximately the same as lead-acid electrochemical cells.

PRIOR ART

It has long been appreciated that very large capacitances exist at the interface between an electrolyte and an irreversible electrode. See R. Kotz and M. Carlen, "Principles and Applications of Electrochemical Capacitors," *Electrochimica Acta* 45, 2483-2498 (2000).

This phenomenon is exploited in today's commercially available electrochemical double layer (EDL) supercapacitors (sometimes referred to as "ultracapacitors"). See "Basic Research Needs for Electrical Energy Storage", *Report of the*

*Basic Energy Science Workshop in Electrical Energy Storage.* U.S. Department of Energy, April 2007."

The accepted mechanism for this dates back to 1853, when von Helmholtz discovered the electrochemical double layer. See H. von Helmholtz, *Ann. Phys.* (Leipzig) 89 (1853) 211. If two electrodes are immersed in an electrolyte, a single layer of negative ions from the electrolyte will form in close proximity to the positive electrode and a second layer of positive ions from the electrolyte will form proximate the aforementioned negative ions, forming the so-called "Helmholtz double layer." A similar process occurs at the opposite negative electrode, though in this case the positive ions form the layer closest to the electrode—this is shown schematically in FIG. 1.

Because this double layer forms only at the interface between electrode and electrolyte, it is necessary to create a structure that maximizes this interfacial region. Traditionally, EDL supercapacitors have been made with high surface area carbon powders and aqueous electrolytes. See B. E. Conway, Electrochemical Supercapacitors—Scientific Fundamentals and Technological Applications, Kluwer, N.Y., 1999. However, the capacitance of an EDL supercapacitor does not always scale with surface area. The most porous carbon powders with the highest surface areas as measured by BET methods sometimes have lower capacitances than other, lower surface area materials. This is usually explained as due to the fact that some pores are the wrong size to form double layer structures.

More recent EDL supercapacitors have used organic solvent-based electrolytes (K. Yuyama, G. Masuda, H. Yoshida, and T. Sato, "Ionic liquids containing the tetrafluoroborate anion have the best performance and stability for electric double layer capacitor applications," *Journal of Power Sources* 162, 1401 (2006)) or even polymeric electrolytes ("Polymer Capacitor Catching Up with Li-ion Battery in Energy Density", http://techon.nikkeibp.co.jp/english/NEWS_EN/20090615/171726/) to boost the maximum voltage between electrodes without initiating electrolysis of the electrolyte. This in turn boosts the maximum energy than can be stored in these capacitors. Recently, Eamex Corporation has claimed an energy density of 600 Wh/liter for a hybrid-EDL supercapacitor that contains a negative electrode that can reversibly incorporate mobile lithium ions from the polymeric electrolyte.

DISADVANTAGES OF THE PRIOR ART

Compared to electrochemical batteries, existing EDL supercapacitors store relatively small amounts of electrical energy per unit mass or volume and they are electrically leaky, meaning that they cannot store their charge over extended periods of time. They have a lower cycle life and peak power output than electrostatic capacitors, though here they are vastly superior to electrochemical batteries. Their liquid electrolytes require hermetically sealed packages and also preclude their use in System in a Package microelectronic applications where all solid-state thin-film lithium batteries are preferred. See B. Neudecker, "Volume PVD Manufacturing of Rechargeable Thin-Film Batteries", Semicon West 2008 TechXpot, San Francisco Calif., July 2008.

In addition, these liquid and organic polymer electrolytes limit the maximum temperature that existing supercapacitors can withstand without failure during fabrication and operation. We therefore postulate that there is a requirement for an all solid-state EDL supercapacitor with improved energy density and reduced electrical leakage compared to the devices that exist today.

The aforementioned hybrid-EDL supercapacitor that uses one electrode that can reversibly incorporate mobile lithium ions from the polymeric electrolyte has one of the drawbacks associated with electrochemical batteries, namely that chemical changes take place during charge/discharge cycles (in the reference given [6], lithium ions undergo a redox reaction at the negative electrode, forming a lithium alloy when the device is charged). Such chemical reactions may compromise the overall cycle life of these hybrid capacitors.

OBJECTS OF THE INVENTION

Based on the limitations of the prior art, there is a need for an improved electrochemical double layer supercapacitor that can store its charge over extended periods of time.

Nothing in the prior art provides the benefits attendant with the present invention. Therefore, it is an object of the present invention to provide an improvement which overcomes the inadequacies of the prior art.

Another object of the present invention is to provide a method for fabricating a supercapacitor-like electronic battery comprising: providing a substrate; forming a first current collector on said substrate; forming a first electrode on said first current collector, said first electrode being formed from a first solid state electrolyte and a first conductive material, said first conductive material being irreversible to mobile ions contained in said first solid state electrolyte, said first conductive material exceeding the percolation limit; forming an electrolyte on said first electrode; forming a second electrode on said electrolyte, said second electrode being formed from a second solid state electrolyte and a second conductive material, said second conductive material being irreversible to mobile ions contained in said second solid state electrolyte, said second conductive material exceeding the percolation limit; and forming a second current collector on said second electrode.

Yet another object of the present invention is to provide a method for fabricating a capacitor comprising: providing a substrate; forming a first current collector on said substrate; forming a first electrode on said first current collector, said first electrode being formed from a first solid state electrolyte and a first conductive material, said first conductive material having a first surface, said first surface being chemically reactive to mobile ions contained in said first solid state electrolyte, said chemical reaction being confined to said first surface, said first conductive material exceeding the percolation limit; forming an electrolyte on said first electrode; forming a second electrode on said electrolyte; and forming a second current collector on said second electrode.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The current invention describes a device structure and manufacturing method to fabricate an all solid-state electrochemical double layer supercapacitor: we prefer to call this device an electronic battery, because although it behaves like a capacitor, storing charge at the interface between the electrodes and dielectric, the amounts of energy that can be stored per unit volume (energy density) and per unit mass (specific energy) are more typical of a battery than a capacitor. The electronic battery is made by combining metallic powders and solid electrolytes to form the composite electrode structures; every other pair of electrodes is separated by a thin dielectric. The device can also be made as a thin-film stack, making it suitable for use in place of thin-film batteries for MEMS (Micro-ElectroMechanical Systems), SiP (System in a Package) and other microelectronic applications.

A feature of the present invention is to provide a method for fabricating a supercapacitor-like electronic battery comprising the following steps. A first current collector is formed on a substrate. The first current collector can further comprise at least two layers consisting of different materials. A first electrode is formed on the first current collector. The first electrode is formed from a first solid state electrolyte and a first conductive material. The first electrode can further comprise co-depositing concurrently a multiphase material. The first solid state electrolyte can be provided in a ratio to the first conductive material so that an electrochemical double layer forms around the surface atoms of each nanoscopic grain of conductor. The first solid state electrolyte and the first conductive material can be intimately mixed at the nanoscale level to ensure that the maximum number of conductive atoms or molecules are adjacent to solid electrolyte molecules. The first conductive material is irreversible to mobile ions contained in the first solid state electrolyte. The first conductive material exceeds the percolation limit. An electrolyte is formed on the first electrode. The electrolyte can further comprise a single insulating component. The electrolyte can further comprise a multicomponent nanostructure. The electrolyte can further comprise a nanocomposite. The nanocomposite can further comprise a ferroelectric material and an electrolyte material. The ferroelectric material can further comprise a relaxor ferroelectric material. The electrolyte can have a thickness in the range 100 Angstroms to 2 microns. The electrolyte can further comprise co-depositing concurrently a multiphase material. A second electrode is formed on the electrolyte. The second electrode can further comprise co-depositing concurrently a multiphase material. The second electrode is formed from a second solid state electrolyte and a second conductive material. The second conductive material is irreversible to mobile ions contained in the second solid state electrolyte. The second conductive material exceeds the percolation limit. A second current collector is formed on the second electrode. The second current collector can further comprise at least two layers consisting of different materials. An encapsulation layer can be formed over the second current collector, the second electrode, the electrolyte, the first electrode and the first current collector. The encapsulation layer can further comprise an organic polymer or an inorganic material. The encapsulation layer can comprise one or multiple applications of various encapsulation materials. A metal overlayer can be applied to the encapsulation layer.

Another feature of the present invention is to provide a method for fabricating a capacitor comprising the following steps. A first current collector is formed on a substrate. A first electrode is formed on the first current collector. The first electrode is formed from a first solid state electrolyte and a first conductive material. The first conductive material has a first surface that is chemically reactive to mobile ions contained in the first solid state electrolyte. The chemical reaction is confined to the first surface. The first conductive material exceeds the percolation limit. An electrolyte is formed on the first electrode. A second electrode is formed on the electrolyte. A second current collector is formed on the second electrode. The second electrode can further comprise a second solid state electrolyte and a second conductive material. The second conductive material can be irreversible or reversible to mobile ions contained in the second solid state electrolyte. The second conductive material can further comprise forming an alloy with a mobile ionic species contained in the electrolyte at the temperatures experienced during fabrication and operation of the capacitor. The second conductive material can have a second surface where the second surface is chemically reactive to mobile ions contained in the second solid state electrolyte. The chemical reaction can be confined to the second surface. The second conductive material can exceed the percolation limit.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 1 is a schematic view of an electrochemical double layer according to one embodiment of the present invention;

FIG. 2 is a schematic cross-section view of a single layer electronic battery according to one embodiment of the present invention;

FIG. 3 is a schematic cross-section view of a multi-layer electronic battery according to one embodiment of the present invention;

FIG. 4 is a schematic cross-section view of a thin-film electronic battery according to one embodiment of the present invention; and FIG. 5 is a schematic cross-section view of a multi-layer thin-film electronic battery according to one embodiment of the present invention.

Similar reference characters refer to similar parts throughout the several views of the drawings.

DETAILED DESCRIPTION OF THE INVENTION

A schematic of the cell structure of an electronic battery is shown in FIG. 2. The basic concept is very similar to existing EDL supercapacitors and electrochemical batteries but there are some important differences. First, each electrode is fabricated from a solid-state electrolyte and a conductive material that is irreversible to the mobile ions contained in the solid electrolyte. This differs from electrochemical batteries which typically use conductive electrode materials that are reversible to the mobile ions in the electrolyte. An irreversible electrode prevents mobile ions from crossing the interface from electrolyte into the electrode when current is passed through the external circuit; a reversible electrode allows mobile ions to cross the interface from the electrolyte during the passage of current through the external circuit, thus the electrodes in electrochemical batteries undergo chemical changes during charging and discharging. These can take the form of phase changes, structural changes and/or volume changes, all of which can severely degrade the integrity of the electrodes over many charge-discharge cycles and reduce the capacity of the batteries. In contrast, an irreversible electrode/ electrolyte interface results in charge separation across the interface due to the formation of the Helmholtz double layer (FIG. 1). This double layer structure persists until a potential across the electrodes is reached that is sufficient to allow the onset of electrolysis. As long as electrolysis does not occur, a capacitor fabricated thus can undergo hundreds of thousands or even millions of charge/discharge cycles without undesirable chemical changes occurring. In addition, because of the absence of chemical processes within the electrodes, charge can be absorbed or released very rapidly by such a capacitor, allowing for rapid charging/discharging and very high power densities.

The electronic battery differs from traditional EDL supercapacitors because it is fabricated from solid electrolytes rather than liquid or polymeric electrolytes. It must therefore be fabricated by different methods than existing EDL supercapacitors.

The amount of energy that can be stored in an electronic battery depends critically on the electrode/electrolyte interfacial area and on the voltage across the electrodes. Electrode and electrolyte material that is not a part of the electrochemical double layer structure will not contribute to the amount of energy stored, therefore it is important that electrode and electrolyte material be intimately mixed at the atomic or molecular level. Such a structure could be characterized as a nanocomposite.

For a single cell, the maximum voltage across the electrodes is limited by the electrochemical stability range of the electrolyte. For thermodynamic stability, this is limited to ~7V, though some solid electrolytes have kinetic stability limits that are significantly higher. By stacking individual cells together as shown in FIG. 3, it is possible to fabricate electronic batteries with much higher operating voltage ranges (hundreds of volts, kV or even MV), limited only by practical considerations. Such stacks would require control circuitry to account for differences in impedance between the various cells during charging and discharging, but this technology has already been developed for lithium-ion batteries (R. S. Tichy and M. Borne, "Building Battery Arrays with Lithium-Ion Cells", Micro Power Webinar, March 2009) and could easily be modified to function with high voltage serially connected electronic battery stacks.

In order to maintain the high power densities characteristic of capacitors, the impedance of the electrodes must be kept low. The amount of electronically conductive material contained in the electrode must exceed the percolation limit to ensure adequate conductivity. The percolation limit depends on the properties of the electrode and electrolyte materials chosen. Typically, more conductive electrode materials exhibit lower percolation limits but the situation is complicated by the extremely small particle sizes contained in the electrode nanocomposite.

Even modest voltages across nanoscopic dimensions create very high electric fields. These can give rise to internal leakage across the battery, a known problem for existing EDL supercapacitors, but can be mitigated by judicious engineering of the electronic battery cell, specifically the selection of the solid electrolyte and the dielectric separator between the two electrodes (see FIG. 2).

This invention describes methods to fabricate electronic batteries by thin-film methods, suitable for incorporation into micro-electronic devices and by more economical, scaleable techniques for portable electronics, electric appliances and ultimately for large vehicular and power station applications.

A thin-film electronic battery 10 (as illustrated schematically in FIG. 4) can be fabricated as follows: a suitable substrate 20 is coated with a conductor that will serve as one of the current collectors 30 of the battery 10. This current collector material can be quite thin: in principle it can be as thin as 5 nm (50 Angstroms) though it would be more robust and could carry more current if it was thicker, with the preferred thickness being in the range of 100-500 nm (1,000-5,000 Angstroms). Preferably, the current collector 30 chosen should not react or alloy with the nanocomposite electrode 40 at the temperatures experienced during fabrication and operation of the battery 10. However, in the special case of the hybrid capacitor that can be made according to the disclosure provided here, it will be desirable to allow alloy formation with a mobile ionic species contained in the solid electrolyte. In many cases, the current collector 30 should be the same material that comprises the electronically conductive component of the nanocomposite electrode 40 with which it is in contact. In some cases, it may be desirable to deposit a current collector 30 comprised of two or more layers consisting of different materials. For example, a thin Ti layer might be deposited directly onto the substrate 20 to ensure good adhesion between the substrate 20 and the current collector 30 during subsequent processing, a thin TiN (titanium nitride) layer might be deposited on top of the Ti to prevent reaction and/or inter-diffusion of the Ti with the other constituents of the current collector 30 stack, and a more conductive metal such as Pt or Ni might comprise the bulk of the current collector 30 stack. The current collector 30 can be deposited by a number of thin-film deposition techniques including but not limited to DC magnetron sputtering, RF magnetron sputtering, thermal evaporation, e-beam evaporation, molecular beam epitaxy, chemical vapor deposition, plasma-enhanced chemical vapor deposition, atomic layer deposition, electroplating, electroless plating, sol-gel coating, plasma spray, twin wire arc spray, thermal spray and arc evaporation.

In some embodiments, the thin-film current collector 30 stack can now be patterned according to techniques known in the semiconductor industry and familiar to those skilled in the art. Another option is to provide a mask to prevent deposition of subsequent films on unwanted regions of the current collector 30. This masking technique is only effective for line-of-sight physical vapor techniques such as DC magnetron sputtering, RF magnetron sputtering, thermal evaporation, e-beam evaporation, molecular beam epitaxy, plasma spray, twin wire arc spray, thermal spray and arc evaporation.

Electrode 1 40 can now be deposited onto the current collector. Electrode 1 40 comprises a nanocomposite material that contains both electrically conducting and ionically conducting components. The overall composition should be electrically conductive—this can be achieved by ensuring that sufficient amounts of conductive material are included. For energy storage purposes, the optimum ratio of electrically conducting material to ionically material should be adjusted so that an electrochemical double layer forms around the surface atoms of each nanoscopic grain of conductor. This ratio is likely to be optimized at close to equal molar ratios of each component, but the exact number depends on the materials properties of the individual nanomaterials. In practice, however, it may be necessary to increase the fraction of electronic conductor over this optimum theoretical ratio to assure adequate electrical conductance of the electrode.

Electrode 1 40 can be deposited by any of the techniques listed earlier that can be used to deposit the current collector 30 onto the substrate 20, including but not limited to DC magnetron sputtering, RF magnetron sputtering, thermal evaporation, e-beam evaporation, molecular beam epitaxy, chemical vapor deposition, plasma-enhanced chemical vapor deposition, atomic layer deposition, electroplating, electroless plating, sol-gel coating, plasma spray, twin wire arc spray, thermal spray and arc evaporation. It is important that the components of the electrode 40 be intimately mixed at the nanoscale to ensure that the maximum number of conductive atoms or molecules are adjacent to solid electrolyte molecules. If the electrode 40 is prepared by sputtering, evaporation or spray techniques, the electronic conductor and solid electrolyte should be co-deposited concurrently to ensure that the maximum number of conductive atoms or molecules are adjacent to solid electrolyte molecules. Chemical deposition techniques such as chemical vapor deposition or plating should use cycles that deposit first one component and then another. The duration of these cycles should be sufficiently small compared to the overall deposition rate to ensure that only a few monolayers of each component is deposited in a single cycle.

The temperature of the substrate 20 during deposition should be kept sufficiently low to avoid unwanted chemical reactions between the components of the electrode 40. However, higher temperature deposition will generally promote a denser electrode 40 and therefore a higher capacitance/energy storage density. It is particularly advantageous to deposit the electrode 40 at a temperature where the solid electrolyte softens—this typically results in denser structures.

After depositing electrode 1 40, it is necessary to deposit a dielectric separator 50 to prevent internal shorting of the electronic battery 10. This dielectric separator 50 can be a single insulating component or it can be a multicomponent nanostructure. In its most simple form, the dielectric separator 50 can be an ultra-thin layer of solid electrolyte material, identical to that used in the electrodes 40, 60. Preferably, it should be thick enough to be continuous, free of pinholes, and such that internal leakage currents caused by tunneling and other mechanisms should be negligible, even when the battery 10 is fully charged. In practice, the separator 50 thickness will be in the range 10 nm (100 Angstroms)-2 microns. The dielectric separator 50 can be deposited by similar techniques to those used to deposit the current collector 30 onto the substrate 20 and electrode 1 40, including but not limited to DC magnetron sputtering, RF magnetron sputtering, thermal evaporation, e-beam evaporation, molecular beam epitaxy, chemical vapor deposition, plasma-enhanced chemical vapor deposition, atomic layer deposition, electroplating, electroless plating, sol-gel coating, plasma spray, twin wire arc spray, thermal spray and arc evaporation.

The dielectric separator 50 can be a multiphase material co-deposited concurrently. All materials contained in the dielectric separator 50 should be chemically compatible with all materials that constitute the electrodes 40, 60. A preferred embodiment uses a combination solid-electrolyte/ferroelectric dielectric separator 50. The displacement currents that operate in ferroelectrics serve to reduce the overall internal field within conventional electrostatic capacitors, thereby increasing the amount of charge stored on the electrodes 40, 60 for a given potential difference. Energy is also stored by displacement of partially mobile ions inside the crystal lattice of the ferroelectric material. The ferroelectric material can be chosen to have a Curie point significantly below the operating temperature of the electronic battery 10 in which case it will have a remnant polarization after the cell plates are charged. Alternatively, the ferroelectric material chosen can be a relaxor ferroelectric where the operating temperature of the battery 10 is close to the Curie point of the dielectric. Another embodiment uses an internal barrier layer capacitor (IBLC) material which comprises grains of semiconducting or insulating material, typically with a high relative permittivity, with a separate ionically conductive phase in the grain boundaries. See D. C. Sinclair, T. B. Adams, F. D. Morrison, and A. R. West, "$CaCu_3Ti_4O_{12}$: One-step internal barrier layer capacitor", *Appl. Phys. Lett.* 80, 2153 (2002). A preferred embodiment uses the same solid electrolyte in the dielectric separator 50 as is incorporated into the electrodes 40, 60.

Electrode 2 60 is then deposited onto the dielectric separator 50 in a manner similar to that used for electrode 1 40 employing any of the techniques listed earlier, including but not limited to DC magnetron sputtering, RF magnetron sputtering, thermal evaporation, e-beam evaporation, molecular beam epitaxy, chemical vapor deposition, plasma-enhanced chemical vapor deposition, atomic layer deposition, electroplating, electroless plating, sol-gel coating, plasma spray, twin wire arc spray, thermal spray and arc evaporation. Once again, it is important that the components of the electrode 60 be intimately mixed at the nanoscale to ensure that the maximum number of conductive atoms or molecules are adjacent to solid electrolyte molecules. It should be noted that the components of electrode 2 60 do not have to be identical to those used for electrode 1 40, but electrode 2 60 should be electronically conductive and the mobile ion in the solid electrolyte phase in electrode 2 60 should be the same species present in the solid electrolytes used in electrode 1 40 and the dielectric separator 50. As for electrode 1 40, the temperature of the substrate 20 during deposition should be kept sufficiently low to avoid unwanted chemical reactions between the components of the electrode 60.

Following deposition of electrode 2 60, a current collector 70 is deposited in a manner similar to that used earlier to deposit a current collector 30 on the substrate 20. The materials used in this top current collector 70 might be the same as were chosen for the bottom current collector 30, but this is not a necessary condition—in some cases, different materials will be chosen, especially if the components of electrode 1 40 and 2 60 are different.

If higher battery voltages or larger energy densities per unit area are required, thin-film electronic battery cells can be stacked on top of each other by repeating the steps required to deposit another electrode 3 42 that is identical to electrode 1 40, another ultra-thin dielectric separator layer 50, another electrode 4 62 that is identical to electrode 2 60 and another current collector 32. This procedure can be repeated multiple times if necessary. In this way, a thin-film electronic battery stack such as is shown schematically in FIG. 5 can be fabricated.

After all the active components of the thin-film electronic are deposited, it is necessary to deposit encapsulation (not shown). The part of the encapsulating layer in direct contact with the active components of the electronic battery must be electrically insulating and can be an organic polymer or an inorganic material. If an inorganic material is chosen, it should preferably be amorphous or a glass. A metal overlayer (not shown) can be applied to the dielectric encapsulant if desired. The encapsulation layer can be comprised of one or multiple applications of various encapsulation materials. For example, in a preferred embodiment silicon nitride can be used as an encapsulation material. Given the inherent properties of silicon nitride as are apparent to those skilled in the art, oftentimes a second material, such as silicon oxide, is applied over the silicon nitride to ensure that the encapsulation layer hermetically seals the electronic battery. Other examples of materials which can be used as part of the encapsulation layer include silicon oxynitride, parylene, polymers or metals.

The principles and materials involved in fabricating a larger electronic battery for portable electronics, electric appliances, large vehicular and power station applications are very similar to those used to fabricate thin-film batteries. However, some thin-film deposition techniques, especially those involving vacuum deposition such as sputtering and evaporation, are too expensive for consideration for these larger devices. In addition, it now becomes optional to build the battery stack on a substrate since the overall structure will be massive enough that it can be contained in packaging that is free-standing. Thick film techniques such as screen printing, offset printing, ink jet printing and tape casting can now be used to fabricate these structures. The starting materials should be nanoparticles of electronic conductor and solid electrolyte, intimately mixed to maximize the number of conductor atoms or molecules that have electrochemical double layers formed at their surfaces. The nanoparticles can be prepared by co-precipitation or other techniques known to those skilled in the art. Care should be taken to prevent agglomeration of the individual nanoparticles during preparation of the nanocomposite electrodes and separators.

After the electronic battery is assembled and packaged, it should be polarized. This should be done by applying the maximum rated voltage across the external contacts while monitoring the current until it decays to a constant value. During polarization, the cell can be heated to reduce the time required. The temperature chosen is based on the materials properties of the solid electrolyte in the electronic battery, particularly on the temperature variation of the ionic conductivity. Maximum capacity of the battery will be achieved when all of the surface of the conductive material is in contact with an electrochemical double layer formed in the solid electrolyte.

An example of a device fabricated according to the current invention is given below:
Current collector 1: Ti/TiN/Pt
Electrode 1: Ni+LiF
Dielectric Separator: LiF
Electrode 2: Ni+LIF
Current collector 2: Pt Another example that uses a composite ferroelectric/solid electrolyte dielectric separator is given below:
Current collector 1: Ti/TiN/Pt
Electrode 1: Ni+LiF
Dielectric Separator: $BaTiO_3$+LiF
Electrode 2: Ni+LIF
Current collector 2: Pt Another example that uses a different electronic conductor in electrodes 1 and 2 is given below:
Current collector 1: Ti/TiN/Pt
Electrode 1 (Negative electrode): Ni+LiF
Dielectric Separator: LiF
Electrode 2 (Positive electrode): $RuO_2$+LIF
Current collector 2: Pt These examples are intended to be entirely illustrative and are not meant to limit the scope of this invention. Moreover, although various characteristics and advantages of certain embodiments of the present invention have been highlighted herein, many other embodiments will be apparent to those skilled in the art without deviating from the scope and spirit of the invention disclosed.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for fabricating a supercapacitor electronic battery comprising:
providing a substrate;
forming a first current collector on said substrate;
forming a first electrode on said first current collector, said first electrode being formed from a first solid state electrolyte and a first conductive material, said first conductive material being irreversible to mobile ions contained in said first solid state electrolyte, said first conductive material exceeding the percolation limit;
forming an electrolyte on said first electrode;
forming a second electrode on said electrolyte, said second electrode being formed from a second solid state electrolyte and a second conductive material, said second conductive material being irreversible to mobile ions contained in said second solid state electrolyte, said second conductive material exceeding the percolation limit; and
forming a second current collector on said second electrode.

2. The method according to claim 1, further comprising forming an encapsulation layer over said second current collector, said second electrode, said electrolyte, said first electrode and said first current collector.

3. The method according to claim 2, wherein said encapsulation layer further comprising an organic polymer.

4. The method according to claim 2, wherein said encapsulation layer further comprising an inorganic material.

5. The method according to claim 2, further comprising applying a metal overlayer to said encapsulation layer.

6. The method according to claim 2, wherein said encapsulation layer further comprising one or multiple applications of various encapsulation materials.

7. The method according to claim 1, wherein said first current collector further comprising at least two layers consisting of different materials.

8. The method according to claim 1, wherein said second current collector further comprising at least two layers consisting of different materials.

9. The method according to claim 1, wherein said first solid state electrolyte having a ratio to said first conductive material so that an electrochemical double layer forms around surface atoms of each nanoscopic grain of conductor.

10. The method according to claim 1, wherein said first solid state electrolyte and said first conductive material are intimately mixed at the nanoscale to ensure that the maximum number of conductive atoms or molecules are adjacent to solid electrolyte molecules.

11. The method according to claim 1, wherein said electrolyte further comprising a single insulating component.

12. The method according to claim 1, wherein said electrolyte further comprising a multicomponent nano structure.

13. The method according to claim 1, wherein said electrolyte further comprising a nanocomposite.

14. The method according to claim 13, wherein said nanocomposite further comprising:
a ferroelectric material; and
an electrolyte material.

15. The method according to claim 14, wherein said ferroelectric material further comprising a relaxor ferroelectric material.

16. The method according to claim 1, wherein said electrolyte having a thickness in the range 100 Angstroms to 2 microns.

17. The method according to claim 1, wherein said electrolyte further comprising codepositing concurrently a multiphase material.

18. The method according to claim 1, wherein said first electrode further comprising co-depositing concurrently a multiphase material.

19. The method according to claim 18, wherein said second electrode further comprising co-depositing concurrently a multiphase material.

* * * * *

UNITED STATES PATENT AND TRADEMARK OFFICE
CERTIFICATE OF CORRECTION

PATENT NO.        : 8,863,363 B2                                    Page 1 of 1
APPLICATION NO.   : 13/389368
DATED             : October 21, 2014
INVENTOR(S)       : Martienssen et al.

It is certified that error appears in the above-identified patent and that said Letters Patent is hereby corrected as shown below:

On The Title Page
Item (73) Assignee should read -
(73) Assignee: Oerlikon Advanced Technologies AG, Balzers (LI);
         By Rosalinda Martienssen, Werner Oskar Martienssen (deceased), Dreieich, (DE) -

Signed and Sealed this
Twelfth Day of April, 2016

Michelle K. Lee
*Director of the United States Patent and Trademark Office*